Patented Oct. 2, 1945

2,385,931

UNITED STATES PATENT OFFICE 2,385,931

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application December 27, 1941, Serial No. 424,665

8 Claims. (Cl. 260—78)

This invention relates to a new class of unsaturated esters which are capable of polymerization to form new and highly valuable resinous compositions and to such compositions. These new unsaturated compounds are esters of (a) a partial ester of a carbonic acid and (b) an ester of an hydroxy carboxylic acid.

The new esters are esters of unsaturated alcohols, preferably those which contain three to five carbon atoms and which contain an unsaturated group in an aliphatic chain, such as allyl, methallyl, crotyl, isocrotyl, propargyl, isopropenyl, methyl propargyl, ethylallyl, and butadienyl alcohols, methyl vinyl carbinol, ethyl vinyl carbinol, and the corresponding halogen substituted alcohols such as 2-chloroallyl, chlorocrotyl, and 2-bromoallyl alcohols. Moreover, the unsaturated alcohol radical attached to the hydroxy acid may be a vinyl group. Esters of alcohols containing six to ten carbon atoms, for example, the esters of cinnamyl, phenyl propargyl, and propyl allyl alcohols, diallyl carbinol, linalool, geraniol, 1-hydroxy hexadiene-2-4, ethyl isobutenyl carbinol, 1-hydroxyoctene and the halogen substituted products of the same such as chlorocinnamyl alcohol and ethyl chlorallyl carbinol.

The new group of unsaturated compounds are esters of a monohydroxy carboxylic acid such as glycolic, lactic, hydraacrylic, leucinic, salicylic, hydroxy butyric, phloritic, coumarinic, acetonic, meliotic, valerolactinic, or ricinoleic acids or the monohydroxy polycarboxylic acids such as tartronic, malic, oxalacetic, citromalic, hydroxy phthalic, citric, isomalic, and itamalic acids. Acids with more than a single hydroxy group in which all but one of the hydroxy groups are esterified or etherified with a simple monofunctional group such as methyl, ethyl, allyl, etc., or with acetate, formate, propionate, etc., groups are included within the intended scope of the expression "monohydroxy acid" and accordingly, esters of such acids may be prepared in accordance with the present invention. Thus, the methyl, ethyl, allyl, etc. mono ethers of tartaric acid, the methyl, ethyl, allyl, etc. monoethers of glyceric acid, the methyl, ethyl, allyl, etc. ethers of mesoxalic acid and also the monoformate, monoacetate, monopropionate, etc., of tartaric, glyceric, etc. acids are included within the scope of this invention.

The esters which contain two or more radicals derived from unsaturated alcohols are of especial importance. Many of these esters may be represented by the general formula:

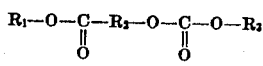

in which $R_1$ and $R_3$ are radicals derived from unsaturated alcohols and $R_2$ is the hydrocarbon or substituted hydrocarbon group which is attached to the hydroxy and carboxylic group of the hydroxy acid.

The new esters may be prepared by reacting a chloroformate with an ester of an hydroxy carboxylic acid or by reacting an alcohol with a chloroformate of an hydroxy carboxylate. For example, phosgene may be reacted with an unsaturated alcohol ester of an hydroxy acid such as allyl lactate, allyl glycolate, allyl salicylate, allyl ricinoleate, allyl hydroacrylate, triallyl citrate, diallyl malate, allyl leucinate, etc., and the corresponding methallyl, vinyl, crotyl, chloroallyl, etc. esters to form corresponding chloroformates or chlorocarbonates having the structure:

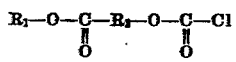

This reaction is conducted at low temperatures, preferably between 0° C. and +10° C. which are maintained by means of an ice bath. The temperatures can be more easily regulated by adjusting the rate of phosgene addition. Since the reaction is exothermic, lower rates of addition favor lower temperatures. The chloroformates thus obtained may be reacted with an equimolar quantity of an unsaturated alcohol which may be the same or different from the unsaturated alcohol used to esterify the hydroxy acid. The reaction is conducted in the presence of an alkaline reagent such as pyridine or other cyclic tertiary amine, or oxide, hydroxide, or carbonate of a strongly electronegative metal. This second step may be conducted at temperatures of 0 to 10° C., although higher temperatures may also be used in certain cases, particularly when calcium carbonate is used as the alkaline reagent. In accordance with a further method, an unsaturated chloroformate such as allyl chloroformate, methallyl chloroformate, chloroallyl chloroformate, etc. may be reacted with an hydroxy ester of an unsaturated alcohol and an monohydroxy carboxylic acid in the presence of an alkaline reagent.

These new unsaturated esters are true chemical compounds having definite boiling and melting points. Accordingly, some of them may be purified by distillation at reduced pressures. However, some of these esters have such high boiling points that the use of distillation methods for purification is impracticable. Accordingly, the compounds may be purified by washing with dilute acids, water, or salt solutions to remove water soluble impurities and by heating under normal or reduced pressures to vaporize the more volatile impurities. When the unsaturated esters being prepared or any of the reactants or intermediate products are solids it may be desirable to conduct the synthesis in the presence of a suitable solvent such as benzene, toluene, ether, xylene, chloroformate, etc., to enable the reaction to proceed in liquid phase. Most of the liquid esters are clear, colorless, and miscible with numerous organic solvents such as acetone, alcohol, chloroformate, dioxane, benzene, xylene, toluene, ethyl ether paraffin hydrocarbons, etc.

The monomeric esters are valuable as plasticizers for various resin materials such as styrene, cellulose, vinyl, urea, protein, phenolic or acrylic resins. Other uses such as solvents, insecticides, and liquid coating compositions are noteworthy. The new compounds polymerize in the presence of heat or light and polymerizable catalysts to yield solid or liquid compositions of widely different physical properties. The polymerization is preferably conducted in the presence of catalysts such as oxygen, ozone, or organic peroxides such as lauryl, benzoyl, and acetone peroxides.

The products of polymerization vary greatly in their physical properties, depending upon the molecular structure of the monomer as well as upon the extent of polymerization. In general, the polymers are clear and transparent and upon polymerization, a range of resins from hard, brittle products to soft, flexible materials may be secured.

Compounds having only a single polymerizable group may be polymerized to form thermoplastic resins which are capable of fusion at elevated temperatures. On the other hand, when the polyunsaturated compounds are polymerized completely, an infusible insoluble resin is produced. Intermediate polymers of the polyunsaturated compounds having a wide range of properties may be secured. Upon the initial polymerization of liquid monomers or solutions of the monomers in suitable solvents, an increase in the viscosity of the liquids occurs due to the formation of a simple polymer which is soluble in the monomer and in solvents such as acetone, benzene, xylene, dioxane, toluene, or carbon tetrachloride. Upon further polymerization, the liquid sets up to form a soft gel containing a substantial portion of a polymer which is substantially insoluble in the monomer and organic solvents and containing as well, a substantial portion of soluble material which may be monomer and/or soluble fusible polymer. These gels are soft and bend readily. However, they are fragile and crumble or tear under low stresses. They may be further polymerized in the presence of catalysts to the final infusible insoluble state in which the polymer is substantially infusible and substantially insoluble in organic solvents, acids, and alkalies.

The monomeric polyunsaturated compounds may be cast polymerized directly to the insoluble, infusible state. This procedure is subject to certain inherent difficulties due to the reduction in volume during the polymerization. The loss of volume or shrinkage causes strains to be established in the hardening gel which frequently results in fractures as the final hard form is attained. It has been discovered that these difficulties may be avoided by releasing the strains established in the gel. This may be done by interrupting the polymerization at an intermediate stage and permitting the strains to be relieved or by conducting polymerization under conditions which permit gradual release of these strains. For example, the polymerization may be conducted in a simple mold until a soft firm gel has formed. At this point the polymerization may be interrupted and the shaped polymer freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the decomposition of the peroxide catalyst. This temperature is dependent upon the catalyst used. For benzoyl peroxide temperatures of 65 to 80° C. are suitable while for acetone peroxide temperatures of 140–150° C. may be used. The soft sheet of gel is then freed of the mold and in accordance with one modification the gel may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air which inhibits polymerization in the presence of a peroxide catalyst such as benzoyl peroxide. By this means a sheet is produced which is hard and smooth on one side while being soft and tacky on the other. The sheet may then be finished by coating the tacky side with monomer or syrupy polymer and polymerizing it in contact with a smooth plate to the insoluble infusible state. Often it is found desirable to release the polymer from the plate one or more times during the polymerization of the coating in order to minimize formation of cracks or other surface defects.

Other methods have been developed for polymerization of the polyunsaturated compounds herein contemplated while avoiding formation of cracks and fractures. By one of the methods the polymerization may be suspended while the monomer-polymer mixture is in the liquid state and before the polymer is converted to the gel by cooling, by removal from exposure to ultra-violet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization, and preferably, at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers are produced by heating the monomer or a solution thereof in the presence of 2 to 5 percent of benzoyl peroxide until the viscosity of the solution has increased about 100 to 500 percent. This may require several hours while heating at 65–85° C. in the presence of benzoyl peroxide. The resulting viscous solution is poured into an equal volume of water, methyl or ethyl alcohol, glycol or other nonsolvent for the fusible polymer. A polymer usually in the form of a powder or a gummy precipitate is thus formed which may be filtered and dried. This permits substantially complete separation of a soluble fusible polymer from unpolymerized monomer. Often, however, such complete separation may not be desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In such applications the composition should contain at least 40 percent and preferably in excess of 50 percent fusible polymer and from about 5 percent to 50 or 60 percent monomer. Preferably, the production of these fusible polymers is conducted by treatment of a solution of the monomer in a solvent for monomer and polymer such as benzene, xylene, toluene, carbon tetrachloride, acetone or other solvent which normally dissolves vinyl polymers. Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may be then treated as above described to separate the fusible polymer from the solvent. These polymers may be used as molding or coating compositions. Due to their solubility they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohol, polyallyl alcohol, polymethallyl alcohol, etc., and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of 1 to 5 percent of benzoyl peroxide, generally in a heated mold. The polymers may be mixed with fillers such as alpha cellulose, wood pulp, and other fibrous substances, mineral fillers, or pigments such as zinc oxide or calcium carbonate, lead chromate, magnesium carbonate, calcium silicate, etc., plasticizers such as the saturated alcohol esters of maleic, fumaric, succinic, and adipic acids or di- or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl Cellosolve, dichlorethyl ether, dibutyl phthalate, or mixtures thereof is useful as a liquid coating composition. Objects of paper, metal, wood, cloth, leather, or synthetic resins may be coated with the solution of polymer in solvent and subsequently polymerized to yield attractively finished coatings. Similarly, porous objects of felt, cloth, leather, paper, etc., either in single layers or laminated may be impregnated with the dissolved fusible polymer and subjected to the polymerization to the final infusible insoluble state.

The following examples are illustrative:

*Example I*

365 parts by weight of allyl chloroformate was added over a period of 2½ hours to 357 parts by weight of allyl lactate dispersed in 268 pts. by wt. of pyridine with stirring at a temperature maintained between 2 and 18° C. The reaction mixture was acidified to the methyl orange endpoint, washed with water, dilute HCl, dilute Na$_2$CO$_3$ solution, and finally again with water. The new compound was dried over anhydrous sodium carbonate and purified by distillation. The product, an ester of allyl acid carbonate and allyl lactate, was a colorless liquid of low viscosity which boiled at 112° C. at 2 mm. of pressure and had an index of refraction ($n_D^{20}$) of 1.438 and a density ($d_4^{20}$) of 1.064. The formula of this compound probably is as follows:

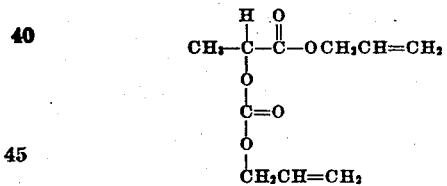

A quantity of the ester of allyl acid carbonate and allyl lactate was heated over an oil bath at a temperature of 150° C., while bubbling a stream of air through the monomer. After about three hours the viscosity of the polymerizing ester had increased noticeably. The fusible polymer was then precipitated by adding methanol and recovered. The fusible polymer was mixed with one percent benzoyl peroxide and molded in a press under a pressure of 2000 pounds per square inch for 30 minutes at a temperature of 145° C. The resulting product was a colorless solid resin.

*Example II*

453 gms. of methallyl lactate was mixed with 298 gms. of pyridine in a reaction vessel equipped with a stirring device. 464 gms. of methallyl chloroformate was slowly added thereto while the reaction mixture was maintained between 10 and 20° C. The product was washed with water and heated at 95–100° C. in the presence of activated charcoal at a total pressure of 15–20 mm., whereby most of the impurities were removed. After the carbon was removed by filtration the methallyl acid carbonate ester of methallyl lactate was dried over anhydrous sodium sulphate. The product is a clear colorless liquid having a density ($d_4^{20}$) of 1.058 and an index of refraction ($N_D^{20}$) of 1.445. This compound has the following probable structure:

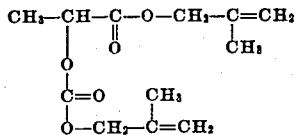

The compound was polymerized by heating in the presence of 5 percent of benzoyl peroxide at a temperature of 70 to 80° C. to form a hard, transparent, and colorless resin.

*Example III*

A mixture of 100 gms. of pyridine and 116 gms. of allyl glycolate was prepared and 130 gms. of methallyl chloroformate was added slowly while the temperature was maintained between +5 and +18° C. The resulting ester was believed to have the molecular constitution:

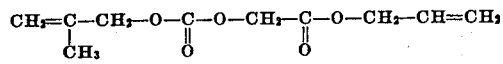

It was freed of impurities by washing with water and dilute HCl and separating from the benzene by distillation at reduced pressures. A five-gram sample was polymerized readily by heating to 75° C. for one hour in the presence of 5 percent benzoyl peroxide.

*Example IV*

150 gms. of allyl leucinate made by the direct esterification of leucinic acid with allyl alcohol was mixed with 500 cc. of benzene. The solution was cooled to about 0° C. in a mixture of ice and salt. Phosgene was bubbled into the cold solution at a rate of about 20-30 millimoles per minute while the reaction mass was stirred. The temperature of the reaction vessel remained between +2 and +12° C. throughout the reaction. The reaction was substantially complete in about 2 hours. A mixture of 50 gms. of allyl alcohol and 80 gms. of pyridine was prepared and the chloroformate solution slowly added while cooling to keep the reaction mass at a temperature below +10° C. at all times. The resulting benzene solution was washed with dilute HCl and with water and finally dried over anhydrous sodium sulphate. The ester was separated from the benzene solvent by heating at a total pressure of between 2 mm. and 10 mm. until the benzene was evaporated. The ester was believed to have the structure:

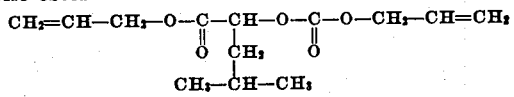

*Example V*

A quantity of the ester prepared as in Example IV was dissolved in benzene to form a 15 percent solution thereof. This solution was mixed with 5 percent benzoyl peroxide (based upon the ester) and heated at 50° C. for two hours. A pronounced increase in viscosity was noted. The viscous solution was then poured into an equal volume of methyl alcohol. A fine pulverulent polymer was precipitated and separated by filtration. After washing and drying a light yellow granular solid was obtained. A five-gram sample was mixed with 3 percent benzoyl peroxide and pressed in a mold at 2000 pounds per square inch at 135° C. A brittle, transparent, and nearly colorless resin was formed.

*Example VI*

A quantity of 60 gms. of methallyl alcohol, 95 gms. of alpha hydroxy butyric acid and 1 gm. of pyrogallol were heated at 85-95° C. for 4 hours. The evolution of water vapor had apparently ceased and the reaction was then cooled to 0° C. and mixed with 500 cc. benzene and 100 gms. of pyridine. Allyl chloroformate was then dropped in slowly at a rate which permitted the reaction temperature to remain below +10° C. The mixture was permitted to stand for 15 hours after the addition was completed. The ester prepared was a high boiling, substantially colorless liquid which is believed to have the following structure:

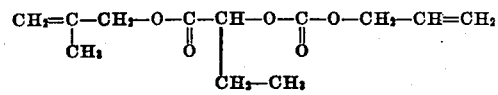

The ester was separated from its impurities by heating at 2-10 mm. until all of the benzene was evolved and was then washed with water and dried over anhydrous sodium sulphate. The ester polymerized upon heating with 2 percent benzoyl peroxide at 85° C. for one and one-half hours.

*Example VII*

60 gms. of allyl alcohol, 1½ gms. of hydroquinone, and 100 gms. of valerolactinic acid were heated at 80-90° C. for 6 hours. After the esterification had taken place to a substantial extent, the excess allyl alcohol was distilled off by heating to 95° C. for one-half hour. One-half liter of benzene was added and the mixture was cooled to 0° C. on an ice bath. Phosgene was passed in at a rate of about 20 millimeters per minute for 10 minutes and then at a rate of 25-30 millimeters per minute for ½ hour. The temperature was maintained between 5° C. and 12° C. throughout the entire reaction. The benzene solution of the chloroformate of the allyl valerolactinate was washed with dilute hydrochloric acid and water water. The solution was then mixed with 40 gms. of allyl alcohol and 80 gms. of pyridine were added slowly at such a rate that the temperature was maintained below 15° C. at all times.

The crude benzene solution was washed with dilute hydrochloric acid, $Na_2CO_3$ solution and finally with water. The benzene was removed by evaporation. The ester was mixed with 2 percent acetone peroxide and heated at 150° C. for one hour. A hard polymerized material was formed.

*Example VIII*

A solution of 178 gms. of allyl salicylate in 1000 cc. of benzene was cooled on an ice bath to +2° C. 100 gms. of pyridine was added to the mixture. Allyl chloroformate (120 gms.) was added slowly at a rate of about 2-3 grams per minute while maintaining the reaction vessel submerged in the ice-salt mixture. The temperature rose to 12° C. but through most of the reaction it remained below +5° C. When the addition of the chloroformate was completed the reaction mass was permitted to warm to room temperature. The solution was washed with dilute HCl and with water and then dried over anhydrous sodium sulphate. The benzene was evaporated by boiling at 2-10 mm. total pressure. The ester thus obtained had the following structure:

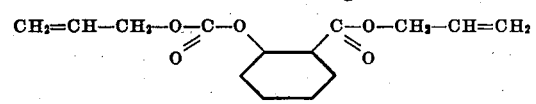

A five-gram sample was mixed with 4 percent acetone peroxide and heated for one hour. A tough polymerized material was produced.

Example IX

Ricinoleic acid (150 gms.) was esterified by heating with 72 gms. of methallyl alcohol and one gram of phenolsulphonic acid for about 3 hours. The ester was washed with a small quantity of water and dried over sodium sulphate. The methallyl ricinoleate thereby produced was dissolved in 1000 cc. of benzene and 50 gms. of pyridine. The mixture was cooled to 0° C. and 65 gms. of methallyl chloroformate were added slowly at a rate which permitted the maintenance of the temperature below 10° C. throughout the reaction. The reaction vessel was immersed in an ice salt mixture during the reaction. The benzene solution of the unsaturated ester was washed with HCl and water and then dried. The ester was separated from the benzene and other impurities by distillation. It has a structure believed to be as follows:

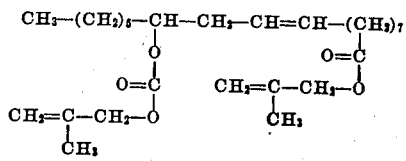

Example X

A solution of 165 gms. of triallyl citrate in 1000 cc. of benzene was treated with an excess of phosgene at temperatures between 0° C. and 10° C. maintained by immersing the reaction vessel in an ice salt mixture. The solution was warmed to 50° C. to evolve the excess phosgene. The benzene solution was washed with water and dried with sodium sulphate. A mixture of 30 gms. of allyl alcohol and 50 gms. of pyridine was prepared in a 1500 cc. flask and placed in an ice bath. The benzene solution of the chloroformate was added slowly at the rate of 20–30 cc. per minute. The temperature of the reaction mass varied from +2° C. to +12° C. during the addition. The ester in benzene solution was washed in HCl and water. The benzene was removed by heating in a vacuum. An ester of the following composition was thereby produced:

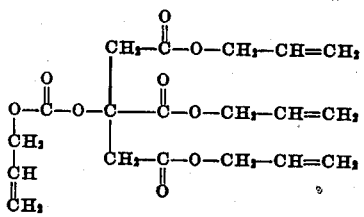

A ten-gram sample was mixed with five percent benzoyl peroxide and heated at 75° C. for one hour. A brittle, transparent, resinous composition was produced.

Example XI

The procedure of Example VIII was duplicated except that chlorallyl alcohol was used in place of allyl alcohol. An ester having the following molecular constitution was believed to have been synthesized:

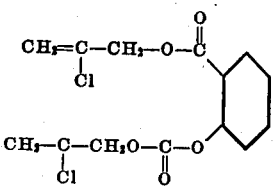

Although the invention has been described with respect to certain specific details, it is not intended that these details shall constitute limitations upon the invention except as they are incorporated in the following claims.

This application is a continuation-in-part of applications Serial No. 392,103, filed May 6, 1941, and Serial No. 361,280, filed October 15, 1940, both by Irving E. Muskat and Franklin Strain.

We claim:

1. An ester of triallyl citrate and allyl acid carbonate.
2. An ester of chlorallyl salicylate and chlorallyl acid carbonate.
3. An ester of methallyl ricinoleate and methallyl acid carbonate.
4. A polymer of an ester of triallyl citrate and allyl acid carbonate.
5. A polymer of an ester of chlorallyl salicylate and chlorallyl acid carbonate.
6. A polymer of an ester of methallyl ricinoleate and methallyl acid carbonate.
7. A compound having the structural formula:

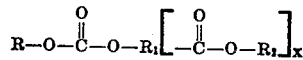

wherein R is a radical equivalent to the radical R in the alcohol ROH, said alcohol being an unsaturated monohydric alcohol having from 3 to 10 carbon atoms and having a carbon to carbon unsaturated linkage between the beta and gamma carbon atoms therein, $R_1$ is a hydrocarbon radical having a valence of (X+1), $R_2$ is a radical equivalent to the radical $R_2$ in the alcohol $R_2OH$, said alcohol being an unsaturated monohydric alcohol having from 2 to 10 carbon atoms and having a carbon to carbon unsaturated linkage adjacent the beta carbon atom therein, and X is a small whole number from one to three.

8. A polymer of the compound defined in claim 7.

IRVING E. MUSKAT.
FRANKLIN STRAIN.